United States Patent Office 3,778,300
Patented Dec. 11, 1973

3,778,300
METHOD OF FORMING IMPERMEABLE CARBIDE COATS ON GRAPHITE
Cornel Wohlberg, Los Alamos, N. Mex., assignor to the United States of America as represented by the United States Atomic Energy Commission
No Drawing. Filed Oct. 7, 1966, Ser. No. 586,000
Int. Cl. C23f 11/00
U.S. Cl. 117—118     8 Claims

ABSTRACT OF THE DISCLOSURE

A method of forming an impermeable refractory metal carbide coating on graphite in which a metal containing oxidant and a carbide former are applied to the surface of the graphite, heated to a temperature of between 1200° C. and 1500° C. in an inert gas, and applying a vacuum and continuing to heat to about 2300° C.

---

The invention described herein was made in the course of, or under, a contract with the U.S. Atomic Energy Commission.

This invention relates to a method of making carbide coatings on graphite less permeable and, more particularly, a method of recrystallizing a niobium carbide coat on graphite so that the coating is less porous. In many applications (e.g., coolant channel coatings in nuclear reactors) it is desirable that a refractory carbide coating be impermeable to any gases which may be present.

According to the present invention this objective is achieved by applying a metal containing oxidant (supplier of oxide) to a preformed coating of niobium carbide on graphite, said oxide reacting and vaporizing at or below the carbiding temperature. Alternatively, and usually preferably, the oxidant may be the original carbiding mixture which is heated to a temperature below the carbiding temperature (of the major metal such as Nb). In either case, a vacuum is applied before the carbiding temperature is reached. The oxidant selected (or the oxide thereof) should not disappear by vaporization, without having first reacted with the carbide coat, at a temperature below that at which the vacuum is applied.

A standard method of preparing a refractory metal carbide on graphite is to heat the refractory metal oxide to the carbiding temperature at atmospheric pressure in an inert gas. One of the disadvantages of such a coating is its relative porosity. According to this invention it has been found that a less permeable coating can be formed by applying an oxidant either to a porous coating or a bare graphite surface, heating to between 1200 and 1500° C. at atmospheric pressure in an inert gas, applying a vacuum and continuing heating to about 2300° C. The vacuum should be on the order of about 2–10 microns. After heating, a visible change is noted in the appearance of the samples. The resulting coats are shiny and look as if they had melted. Most of the original grains have disappeared and those that remain seem to be floating in a frozen melt. The preferred oxidant is a metal oxide mixture of $Nb_2O_5$ and $MgO$ in a 1:1 molar ratio in about 10 g. of collodion with a few drops of diacetone alcohol (or methanol) added. Other suitable oxidants are the nitrates (e.g., zinc, cesium, sodium, and calcium), carbonates (e.g., calcium, lithium and potassium), phosphates (e.g., lithium, potassium and sodium hexameta) and sulphates such as magnesium.

Example 1.—The oxidant and carbide forming mixture consisted of 10 g. $Nb_2O_5$, 1.52 g. $MgO$ with 10 g. of collodion and a few drops of diacetone alcohol added. This viscous mixture was spread on a graphite strip, placed in a furnace and heated to 1200° C. in He at one atmosphere pressure. At 1200° C. a vacuum was applied and heating continued. Recrystallization was noticed as a darkening of the surface which ceased at 2250° C. although heating was continued to 2500° C. In other instances the same procedure was utilized except that varying temperatures were used at which the vacuum was applied. Temperatures at which vacuum was applied between 1200 and 1500° C. yielded far superior recrystallization than did temperatures either above or below this range or not applying a vacuum at all.

Example 2.—The same procedure and temperatures were utilized as that in Example 1 except that the graphite strip had previously been coated with niobium carbide by applying the niobium oxide and magnesium oxide paint and heating to 2300° C. in He at one atmosphere pressure. No vacuum was applied in the initial coating procedure but after applying a vacuum as above it was noted that recrystallization occurred and the coating was transformed from a very porous to a very impermeable shiny coat.

Example 3.—Zinc nitrate mixed with some water was applied to the surface of a graphite piece coated with niobium carbide. The niobium carbide was initially formed as set forth above (without vacuum). The vacuum was then applied after applying the nitrate at varying temperatures between 1100 and 1625° C. Good recrystallization occurred at 2150–2200° C. if the vacuum had been applied between the temperatures of 1150° C. and 1500° C. Cesium, sodium, and calcium nitrates were also utilized in the same manner and comparable results were obtained, i.e., if a vacuum of about 2 microns was applied between the temperatures of 1100–1500° C. good recrystallization of the niobium carbide coating occurred somewhat above 2000° C. In the absence of applying a vacuum this recrystallization was not observed.

Experiments were also conducted utilizing the same procedure for other materials, such as magnesia, calcium, lithium and potassium carbonates, and phosphates such as potassium and lithium. It was found that the application of a vacuum at a low temperature such as 1200–1500° C. would cause good recrystallization at temperatures slightly above 2000° C. and that this recrystallization would not occur to any extent if the said vacuum was not applied.

The word "recrystallization" has been used in the sense of causing the originally formed crystals to disappear and larger crystals to form. However, the scope of this invention should not be limited by this definition since, e.g., a eutectic may be formed in some cases.

Other metals of the IV–B, V–B and VI–B (excluding chromium since it has a high vapor pressure) group metals can be used in place of niobium as a carbide former in practicing this invention.

What is claimed is:

1. A method of forming an impermeable refractory metal carbide coating on graphite which comprises applying a metal oxidant being selected from the class consisting of an oxide mixture of niobium and magnesium, nitrates of zinc, cesium, sodium and calcium, carbonates of calcium, lithium and potassium, phosphates of lithium, potassium and sodium, and the sulfate of magnesium and a refractory metal carbide forming element selected from the group consisting of niobium, titanium, zirconium, hafnium, vanadium, tantalum, molybdenum and tungsten, to the surface and heating to between about 1200° C. and 1500° C. in an inert gas, applying a vacuum and continuing heating to about 2300° C.

2. A method as in claim 1 wherein the refractory metal carbide is niobium carbide and the oxidant is an oxide mixture of niobium and magnesium.

3. A method as in claim 2 wherein the vacuum is between about 2–10 microns.

4. A method as in claim 2 wherein the graphite has been previously coated with niobium carbide.

5. A method as in claim 1 wherein the oxidant is zinc nitrate.

6. A method as in claim 1 wherein the oxidant is at least one of the carbonates selected from the class consisting of calcium, lithium, and potassium.

7. A method as in claim 1 wherein the oxidant is at least one of the phosphates selected from the class consisting of potassium and lithium.

8. A method as in claim 1 wherein the refractory metal carbide forming element is molybdenum.

References Cited
UNITED STATES PATENTS

| | | | |
|---|---|---|---|
| 2,962,388 | 11/1960 | Ruppert et al. | 117—119 |
| 3,141,829 | 7/1964 | Fortescue et al. | 176—37 |
| 3,151,852 | 10/1964 | Weech et al. | 263—47 |
| 3,306,764 | 2/1967 | Lewis et al. | 117—228 |

HARVEY E. BEHREND, Primary Examiner

U.S. Cl. X.R.

117—119, 169